Patented Nov. 30, 1937

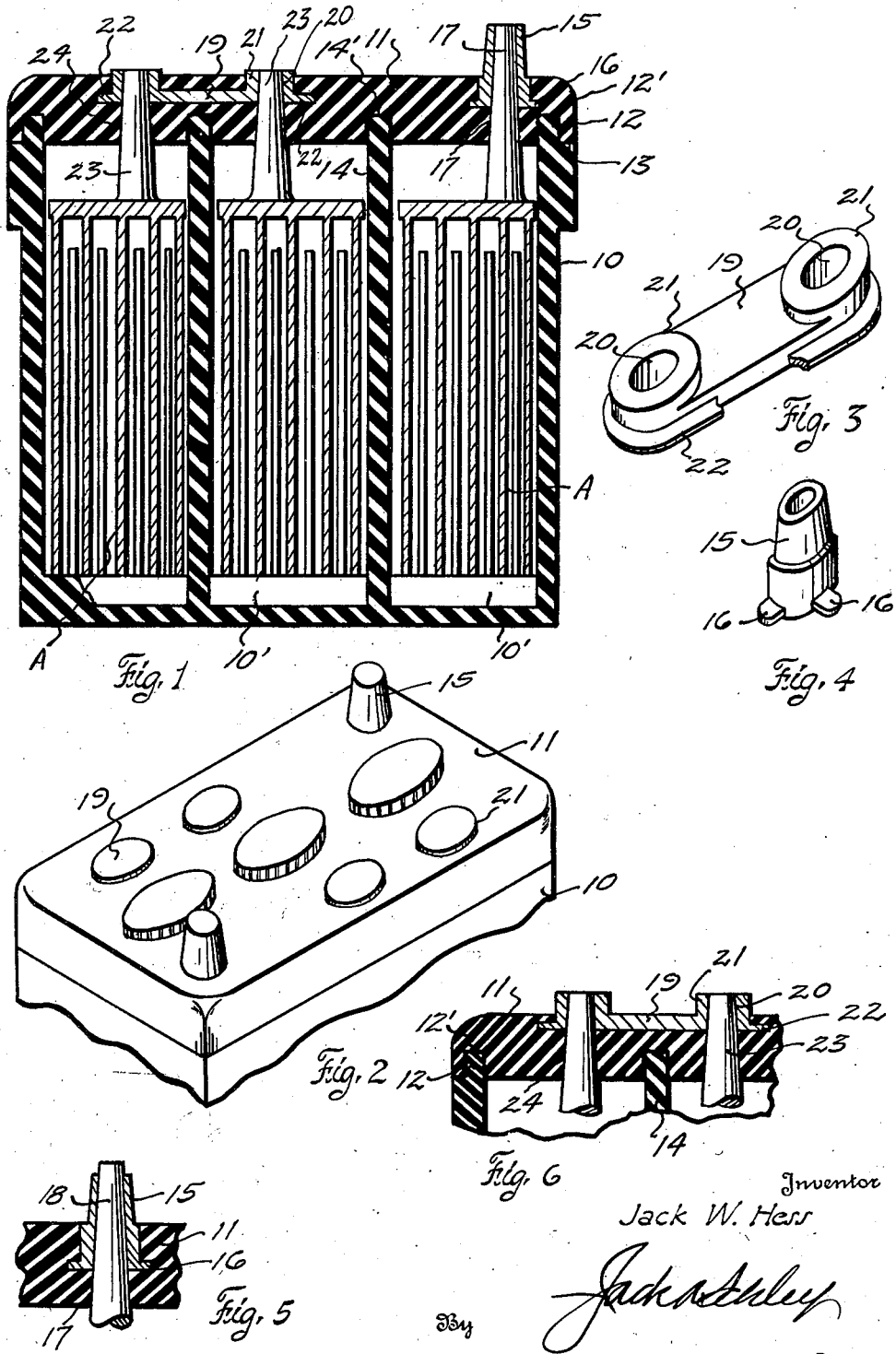

2,100,333

UNITED STATES PATENT OFFICE 2,100,333

STORAGE BATTERY

Jack W. Hess, Dallas, Tex., assignor, by direct and mesne assignments, to The Richardson Company, a corporation of Ohio Application March 22, 1934, Serial No. 716,848

3 Claims. (Cl. 136—134)

This invention relates to new and useful improvements in storage batteries.

One object of the invention is to provide an improved box and terminal structure, whereby the cover of a multi-cell box may be made in one piece and adequately sealed on the box and the plates rigidly supported in said cover so as to prevent leaks as well as movement of its plates when the battery is subjected to road shocks.

A further object of the invention is to provide an improved terminal post or connector in conjunction with the cover, whereby molding by the installer is eliminated and also whereby the post and sleeve are quickly united by lead-burning without adding additional metal.

Another object of the invention is to provide terminal sleeves and connectors molded in the cover and ready to receive its plate posts, thus assuring quick positive connections in assembling the battery and guarding against leaks around said sleeves and connectors, as well as making for more ready assembly and sturdy structure.

A construction designed to carry out the invention will be hereinafter described together with other features of the invention.

The invention will be more readily understood from a reading of the following sepcification and by reference to the accompanying drawing in which an example of the invention is shown, and wherein:

Figure 1 is a longitudinal sectional view of a storage battery constructed in accordance with the invention.

Figure 2 is an isometrical view of the upper portion of the same.

Figure 3 is a detail of one of the connectors.

Figure 4 is a detail of one of the sleeves.

Figure 5 is a sectional view showing one of the post and sleeve connections prior to lead-burning, and, Figure 6 is a sectional view showing another form of connector mounting.

In the drawing the numeral 10 designates a battery box and 11 a cover therefore. These parts may be molded or otherwise formed of any composition suitable for the purpose, such as is now the common practice. The upper edge of the box 10 is shown with an upright continuous marginal flange 12 and a continuous shoulder 13 directed outwardly from said flange. The box is formed with a plurality of transverse partitions 14, depending upon the number of cells, and the upper edges of these partitions terminate in a plane substantially flush with the top of the flange.

One of the features of the invention is making the cover 11 in one piece instead or providing a separate cover for each cell. The underside of the cover is provided with a marginal groove 12' and transverse grooves 14'. The groove 12' receives the flange 12, while grooves 14' receive the upper edges of the partitions. The grooves are of sufficient size to receive a sealing compound, which is also applied between the margin of the cover and the shoulder 13, whereby the cover is effectually secured on the box without the use of metal or other fasteners.

The sealing of the cover is very important as it prevents leaking and also provides a rigid support for the plates, as will be hereinafter described. It of course does away with the separate cell covers and the sealing seams around the same, thereby eliminating seam leaks and cracking. The upper edges and corners of the cover may be rounded, thus preventing chipping and providing a smooth and attractive appearance.

Another feature of the invention is the mounting of the terminals and connectors. At diagonally opposite corners of the cover metal sleeves 15 are embedded, being molded in said cover. These sleeves are formed of lead or other metal usually used for this purpose. Each sleeve has a reduced upper end which projects above the cover and laterally directed lugs 16 which are embedded in the cover and serve to hold the sleeve therein, the cover has an opening or aperture 17 conforming to the bore of the sleeve and extending downwardly from each sleeve.

The plate groups A rest upon the usual bridges 10' at the bottoms of the cells and the plate posts 18 extend upwardly through apertures 17 and the sleeves 15 in which they have tight fit. It is desirable to have the posts 18 project slightly above the sleeves, but this is not essential. In order to fasten the posts in the sleeves, it is only necessary to lead-burn their upper ends, whereby integral terminal posts are provided without adding metal or molding said posts.

For connecting the plate groups A connectors 19 are molded or cast in the cover. Each connector has a pair of apertures 20 surrounded by upstanding collars 21. For retaining the connector in the cover it is provided with an outwardly directed reduced marginal flange 22, so that said connector may be embedded in the cover as is shown in Figs. 1 and 2, or mounted with its top substantially flush with the upper surface of cover, as is shown in Fig. 6.

The plate posts 23 extend through openings 24 in the cover upwardly through the apertures 20 and collars 21 of the connectors. The collars in all forms project above the cover and by lead-burning the upper ends of the posts and collars, fastenings are obtained.

In assembling the battery it is merely necessary to spread the sealing compound in the grooves 12' and 14' and then place the cover on the box, after guiding the posts 18 and 21 through the openings 17 and 24 into the sleeves 15 and the connectors 19. By pressing the cover down it is sealed in place and rigidly supported. When the posts are lead-burned the assembly is completed. The sleeves and connectors being molded in the cover, they are not only rigidly mounted, but all chance of leaks is eliminated. Because of the rigid mounting of the terminals and connectors, the plate groups can not move up and down and batter the bridges 10'. The finished battery as shown in Fig. 2 presents a tight, smooth and sturdy structure. The work of assembling is reduced to a minimum and the necessity of sealing seams is obviated.

The description which has been given recites more or less detail of a particular embodiment of the invention, which is set forth as new and useful; however, I desire it understood that the invention is not limited to such exact details of construction, because it is manifest that changes and modifications may be made, within the scope of the appended claims, without departing from the spirit of the invention.

What I claim and desire to secure by Letters Patent, is:

1. A moulded cover for a multi-cell storage battery comprising a flat body so shaped peripherally as to cooperate with the upper edges of the side and end walls of a storage battery case and having intermediate grooves to accept the upper edges of the partition walls thereof, a pair of metallic terminal members located adjacent diagonally opposite corners of said cover and comprising bodies embedded in the material of said cover and terminal-forming extensions projecting above the upper face of said cover, and diagonally oppositely disposed connector members spanning adjacent cells and having bodies embedded in the material of said cover, and extensions at the ends of said bodies projecting above the upper face of said cover, said terminal members, said extensions on said connector members and said cover having perforations therethrough, whereby plate structures may be assembled to said cover and all connections completed by passing the lugs of plate assemblies through said perforations and fusing said lugs respectively to the projecting portions of said terminal and connector members.

2. A moulded cover for a multi-cell storage battery comprising a flat body so shaped peripherally as to cooperate with the upper edges of the side and end walls of a storage battery case and having intermediate grooves to accept the upper edges of the partition walls thereof, a pair of metallic terminal members located adjacent diagonally opposite corners of said cover and comprising bodies embedded in the material of said cover and terminal-forming extensions projecting above the upper face of said cover, and diagonally oppositely disposed connector members spanning adjacent cells and having bodies embedded in the material of said cover, and extensions at the ends of said bodies projecting above the upper face of said cover, said terminal members, said extensions on said connector members and said cover having perforations therethrough, whereby plate structures may be assembled to said cover and all connections completed by passing the lugs of plate assemblies through said perforations and fusing said lugs respectively to the projecting portions of said terminal and connector members, said extensions being thick-walled extensions, and said terminal-forming extensions constituting the terminals for the storage battery.

3. A metallic connector member for a multi-cell storage battery of a type having a single integral cover, said connector having an elongated body portion adapted to be embedded in the material of a cover and to bridge the space between cells, a peripheral flange portion located at the lower edge of said body portion, and thick walled extensions rising from the upper face of said body portion at each end thereof, said extensions and said body portion having continuous conical perforations therethrough to accept the tapered lugs of plate assemblies.

JACK W. HESS.